(12) United States Patent
Giacona et al.

(10) Patent No.: US 7,322,089 B2
(45) Date of Patent: Jan. 29, 2008

(54) METHOD OF INSERTING A VALVE STEM INTO A VALVE STEM APERTURE DEFINED BY A WHEEL MOVABLE ALONG AN ASSEMBLY LINE

(75) Inventors: Ben Giacona, Grosse Pointe Woods, MI (US); Dan Pellerin, Howell, MI (US); Brian Hoy, Brighton, MI (US); Eugene M. Mondrusov, Novi, MI (US)

(73) Assignee: Durr Systems, Inc., Plymouth, MI (US)

( * ) Notice: Subject to any disclaimer, the term of this patent is extended or adjusted under 35 U.S.C. 154(b) by 470 days.

(21) Appl. No.: 10/846,823

(22) Filed: May 14, 2004

(65) Prior Publication Data

US 2005/0044682 A1 Mar. 3, 2005

Related U.S. Application Data

(63) Continuation-in-part of application No. 10/740,296, filed on Dec. 18, 2003, now Pat. No. 7,181,832.

(60) Provisional application No. 60/460,153, filed on Apr. 3, 2003, provisional application No. 60/453,262, filed on Mar. 10, 2003.

(51) Int. Cl.
*B23Q 17/00* (2006.01)
*B23P 21/00* (2006.01)

(52) U.S. Cl. ............... 29/407.04; 29/894.351; 29/407.1; 29/714

(58) Field of Classification Search ............ 29/894.37, 29/890.123, 249, 407.04, 407.09, 407.1, 29/709, 221.5, 714, 720; 73/146.8, 800
See application file for complete search history.

(56) References Cited

U.S. PATENT DOCUMENTS

| 2,016,994 A | 10/1935 | Fleming ............... 198/204 |
| 1,850,053 A | 3/1952 | Stevens |
| 2,665,747 A | 1/1954 | Harrison ............... 157/1.1 |
| 2,894,262 A | 7/1959 | Schafroth ............... 1/13 |
| 3,835,982 A | 9/1974 | Zappia ............... 198/204 |
| 4,007,827 A | 2/1977 | Mattos ............... 198/862 |
| 4,146,126 A | 3/1979 | Mattos ............... 198/862 |

(Continued)

*Primary Examiner*—David P. Bryant
*Assistant Examiner*—Sarang Afzali
(74) *Attorney, Agent, or Firm*—Howard & Howard Attorneys, P.C.

(57) ABSTRACT

The present invention provides an enhanced method and apparatus for locating a valve stem aperture in a wheel. The invention includes a locating station having an overhead camera to scan the wheel. The scanned image of the wheel is received by a controller and is divided into radial zones. The controller locates the radial zone that defines the valve stem aperture from the scanned image of the wheel. The wheel then moves along an assembly line to a stemming station. A robot is positioned at the stemming station. The robot supports a valve stem insertion tool and a valve stem aperture locating sensor. When the wheel reaches the stemming station, the robot moves the valve stem insertion tool and the valve stem aperture locating sensor to the radial zone that defines the valve stem aperture. The robot moves the valve stem aperture locating sensor along the radial zone that defines the valve stem aperture and locates the valve stem aperture. The robot then moves the valve stem insertion tool into position and inserts a valve stem in the valve stem aperture.

9 Claims, 9 Drawing Sheets

U.S. PATENT DOCUMENTS

| | | | |
|---|---|---|---|
| 4,353,156 A | 10/1982 | Rosaz | 29/221.5 |
| 4,420,026 A | 12/1983 | Goiseau | 157/1.24 |
| 4,573,859 A | 3/1986 | Amano et al. | 414/628 |
| 4,621,671 A | 11/1986 | Kane et al. | 157/1.1 |
| 4,638,756 A | 1/1987 | Collmann | 118/215 |
| 4,829,749 A | 5/1989 | Hiyama et al. | 53/538 |
| 4,834,159 A | 5/1989 | Burger | 157/1 |
| 4,951,809 A | 8/1990 | Boothe et al. | 198/841 |
| 5,035,274 A | 7/1991 | Kinnick et al. | 157/1.1 |
| 5,094,284 A | 3/1992 | Curcuri | 157/1.17 |
| 5,131,531 A | 7/1992 | Chambers | 198/860.2 |
| 5,141,040 A | 8/1992 | Curcuri | 157/1.17 |
| 5,170,828 A | 12/1992 | Curcuri | 157/1 |
| 5,341,911 A | 8/1994 | Gamberini et al. | 198/409 |
| 5,529,171 A | 6/1996 | Langenbeck | 198/860.1 |
| 5,749,141 A | 5/1998 | Matsumoto | 29/714 |
| 5,876,501 A | 3/1999 | Doan | 118/679 |
| 5,940,960 A * | 8/1999 | Doan et al. | 29/714 |
| 6,026,552 A | 2/2000 | Matsumoto | 29/407.04 |
| 6,209,684 B1 | 4/2001 | Kane et al. | 184/101 |
| 6,325,202 B1 | 12/2001 | Gaines | 198/583 |
| 6,478,143 B1 | 11/2002 | Enomoto | 198/838 |
| 6,481,083 B1 | 11/2002 | Lawson et al. | 29/407.04 |
| 6,510,942 B2 | 1/2003 | McTaggart et al. | 198/861.1 |
| 2003/0000812 A1 | 1/2003 | McTaggart et al. | 198/860.1 |
| 2003/0010608 A1 | 1/2003 | Jaynes | 198/860.1 |
| 2003/0051326 A1 | 3/2003 | Lawson et al. | 29/407.01 |

\* cited by examiner

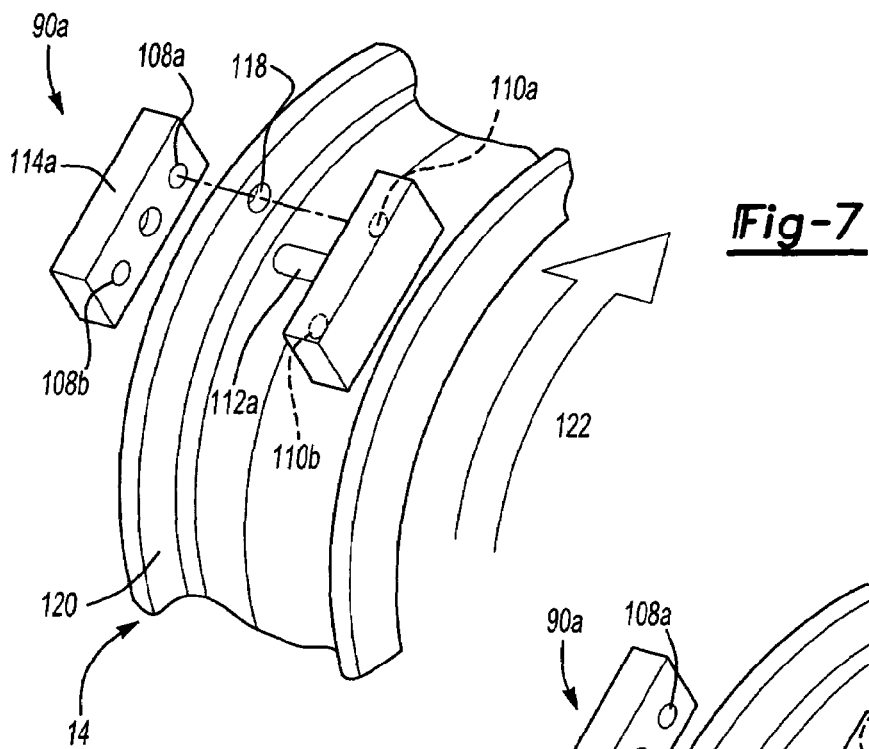
_Fig-7_
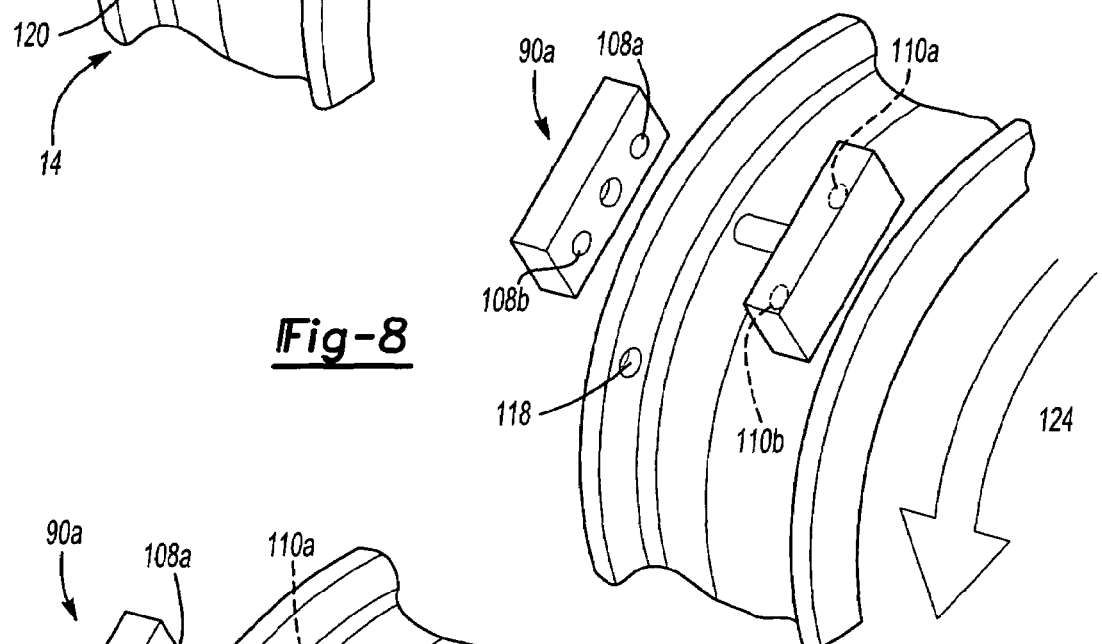
_Fig-8_
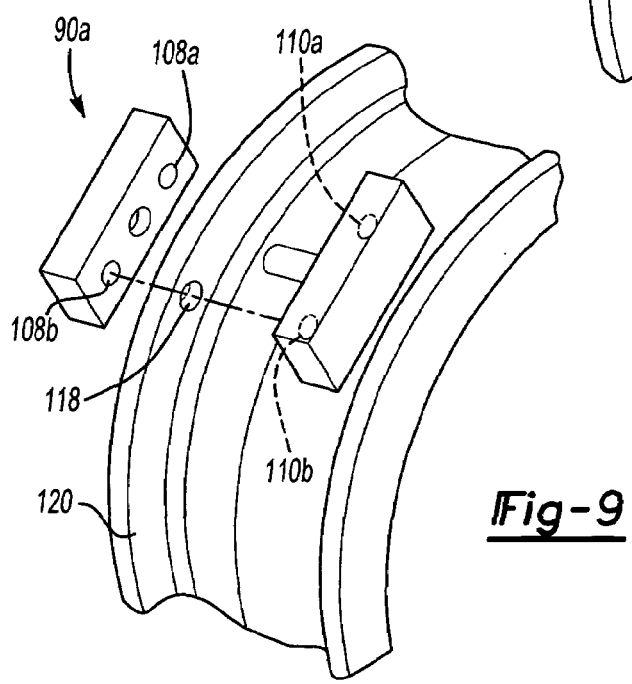
_Fig-9_

METHOD OF INSERTING A VALVE STEM INTO A VALVE STEM APERTURE DEFINED BY A WHEEL MOVABLE ALONG AN ASSEMBLY LINE

RELATED APPLICATIONS

This application is a continuation-in-part of U.S. Ser. No. 10/740,296, for a VALVE STEM INSTALLATION SYSTEM AND METHOD OF INSTALLING VALVE STEM, filed Dec. 18, 2003, now U.S. Pat. No. 7,181,832 which claimed the benefit of the provisional patent application 60/453,262 for a VALVE STEM INSTALLATION SYSTEM AND METHOD OF INSTALLING VALVE STEM, filed on Mar. 10, 2003, and also claimed the benefit of the provisional patent application 60/460,153 for a TIRE PRESSURE MONITORING VALVE STEM INSTALLATION SYSTEM AND METHOD OF INSTALLING TIRE PRESSURE MONITORING VALVE STEM, filed Apr. 3, 2003, which are hereby incorporated by reference in their entireties.

FIELD OF THE INVENTION

The subject invention relates to the assembly of wheels, and more particularly to an apparatus and method for locating a valve stem aperture in a wheel.

BACKGROUND OF THE INVENTION

In the past, a valve stem was manually mounted to a wheel with a stem-inserting tool. Such manual processes are expensive because of the labor and time involved. In addition, operations performed manually are subject to a relatively greater frequency of processing errors in comparison to robot-performed processes.

Several prior art patents disclose processes for mounting a valve stem to a wheel with programmable machines. For example, U.S. Pat. No. 6,481,083 teaches a valve stem assembly line that includes an input conveyor to supply wheels, a locator station positioned at the end of the input conveyor to locate the valve stem aperture defined by the wheel, and a robotic manipulator to grasp the wheel in the locator station and to move the wheel to the mounting station where a valve stem is inserted. U.S. Pat. No. 6,026,552 teaches a spinning device to spin the wheel, an optical sensor to locate the valve stem aperture while the wheel is spinning, and press fitting device that can slide relative to a wheel and insert a valve stem after the valve stem aperture has been located. U.S. Pat. No. 5,940,960 teaches and automatic valve stemming apparatus including a spinning device to spin the wheel, an optical sensor to locate the valve stem aperture, and a valve stem insertion tool to insert a valve stem after the valve stem aperture has been located.

A complication in the development of automated valve stem insertion tools has been the number of differently configured valve stems to be inserted in various wheels. The most common configuration of valve stem has a rubber exterior defining an annular notch for engaging the valve stem aperture. The degree of precision required in locating the valve stem aperture during assembly of the common rubber valve stem with a wheel is relatively less precise relative the assembly of some other types of valve stems because the common rubber valve stem can deform and resiliently return to its original shape. Another type of valve stem includes a tire pressure sensor and is known as a TPM valve stem. A TPM valve stem defines external threads which are inserted through the valve stem aperture and cooperate with a nut after insertion to maintain the position of the tire pressure sensor with respect to the wheel. The degree of precision required in locating the valve stem aperture during assembly of the TPM valve stem with a wheel is relatively more precise relative the assembly of the common rubber valve stem because the threads of the TPM valve stem can be irreparably damaged by contacting the valve stem aperture during assembly.

One of the areas of continuous development and research is the pursuit of flexible systems operable to receive and process several differently configured rims. Another area is the pursuit of less costly valve stem insertion devices. Costliness can be defined by the capital investment required for putting the valve stem insertion system on the factory floor as well as the operating cost associated with the system. In pursuit of these goals, it would be desirable to develop a valve stem insertion system having improved flexibility, cost and efficiency.

BRIEF SUMMARY OF INVENTION

The present invention provides an enhanced method and apparatus for locating a valve stem aperture in a wheel. The invention includes a locating station having an overhead camera to scan the wheel. The scanned image of the wheel is received by a controller and is divided into radial zones. The controller locates the radial zone that defines the valve stem aperture from the scanned image of the wheel. The wheel then moves along an assembly line to a stemming station. A robot is positioned at the stemming station. The robot supports a valve stem insertion tool and a valve stem aperture locating sensor. When the wheel reaches the stemming station, the robot moves the valve stem insertion tool and the valve stem aperture locating sensor to the radial zone that defines the valve stem aperture. The robot then moves the valve stem aperture locating sensor along the radial zone that defines the valve stem aperture and locates the valve stem aperture. The robot then moves the valve stem insertion tool into position and inserts a valve stem in the valve stem aperture.

The present invention provides an advantageous improvement over prior art systems for inserting valve stems in wheels. The invention is flexible to accommodate differently configured wheels. The invention is also less costly and complex since the invention does not require that the location of the valve stem aperture be precisely maintained during movement of the wheel from the locating station to the stemming station. Furthermore, in providing valve stem aperture locating at first and second stations, the invention provides a valve stem insertion apparatus and method that precisely locates the valve stem aperture and reduces the likelihood of damaging the valve stem.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 7-10 are perspective views illustrating a sequence of locating a valve stem aperture and inserting a valve stem in the valve stem aperture;

DETAILED DESCRIPTION OF THE INVENTION

Figure 1:
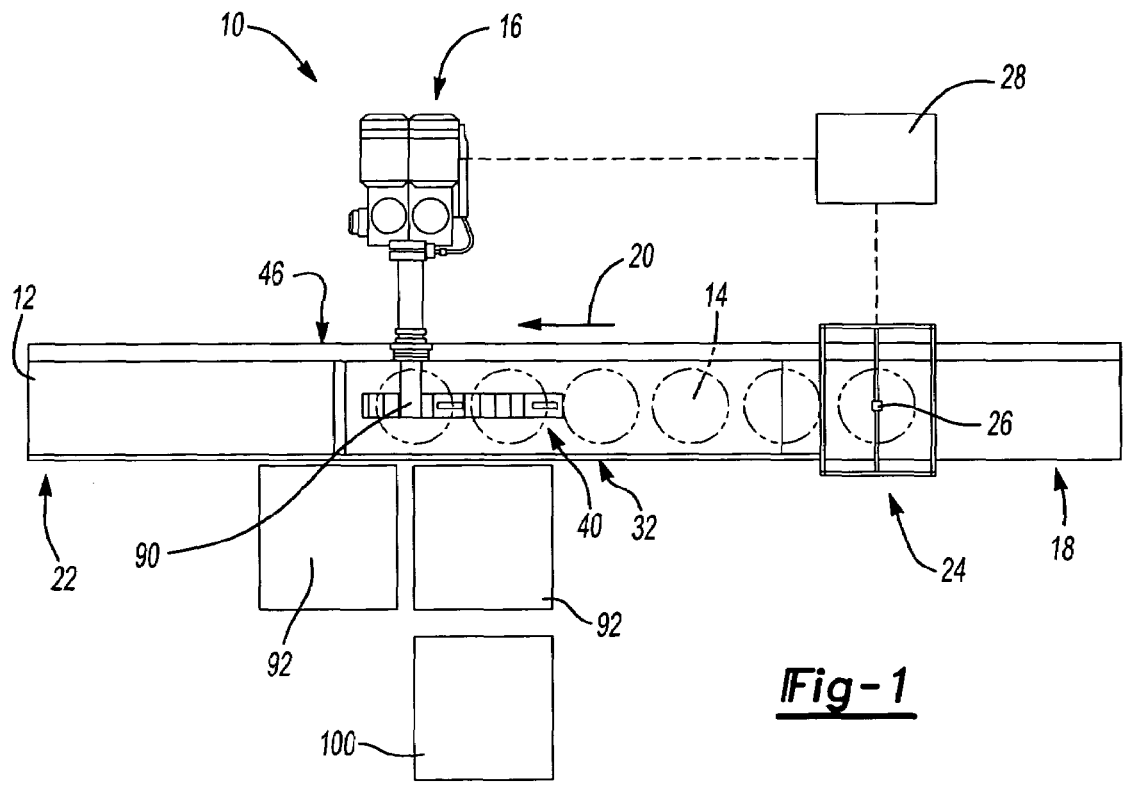
FIG. 1 is an overhead schematic view of a valve stem installation system according to the exemplary embodiment of the invention.

Referring now to FIG. 1, the present invention provides a method and apparatus 10 for inserting a valve stem in a valve stem aperture defined by a wheel. The apparatus 10 includes a conveyor 12 for moving wheels 14 past a robotic apparatus 16. Valve stems are inserted in the valve stem aperture defined by the wheel 14 by the robotic apparatus 16. Wheels 14 can be received at a beginning 18 of the conveyor 12 and move in a direction 20 to an end 22 of the conveyor 12.

Figure 2:
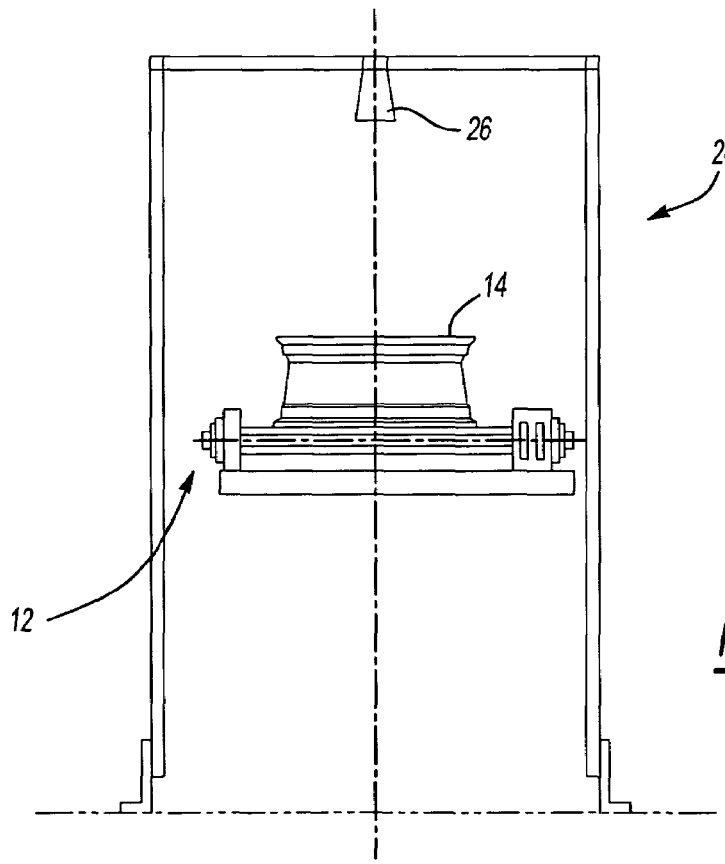
FIG. 2 is a side view of an identification station for the valve stem installation system shown in FIG. 1 for identifying an individual wheel from a plurality of differently configured wheels.

Referring now to FIGS. 1 and 2, during movement of the wheel 14 between the beginning 18 and end 22 of the conveyor 12, the wheel 14 passes through an identification station 24. The identification station 24 can include a camera 26 for identifying the wheel 14 from a plurality of differently configured wheels. When a wheel 14 moves within the visual range of the camera 26, the camera 26 communicates an image of the wheel 14 to a controller 28. The image includes structural features of the wheel 14 including the position of the valve stem aperture. The controller 28 compares the image received from the camera 26 with a plurality of images stored in memory. The images in memory correspond to all of the differently configured wheels that can pass through the identification station 24. Each of the images stored in memory is associated with structural characteristics and physical dimensions of a corresponding wheel 14. The controller 28 controls processing steps performed downstream of the identification station 24 based, at least in part, on the physical dimensions of the wheel 14 identified from the image received from the camera 26.

Figure 3:
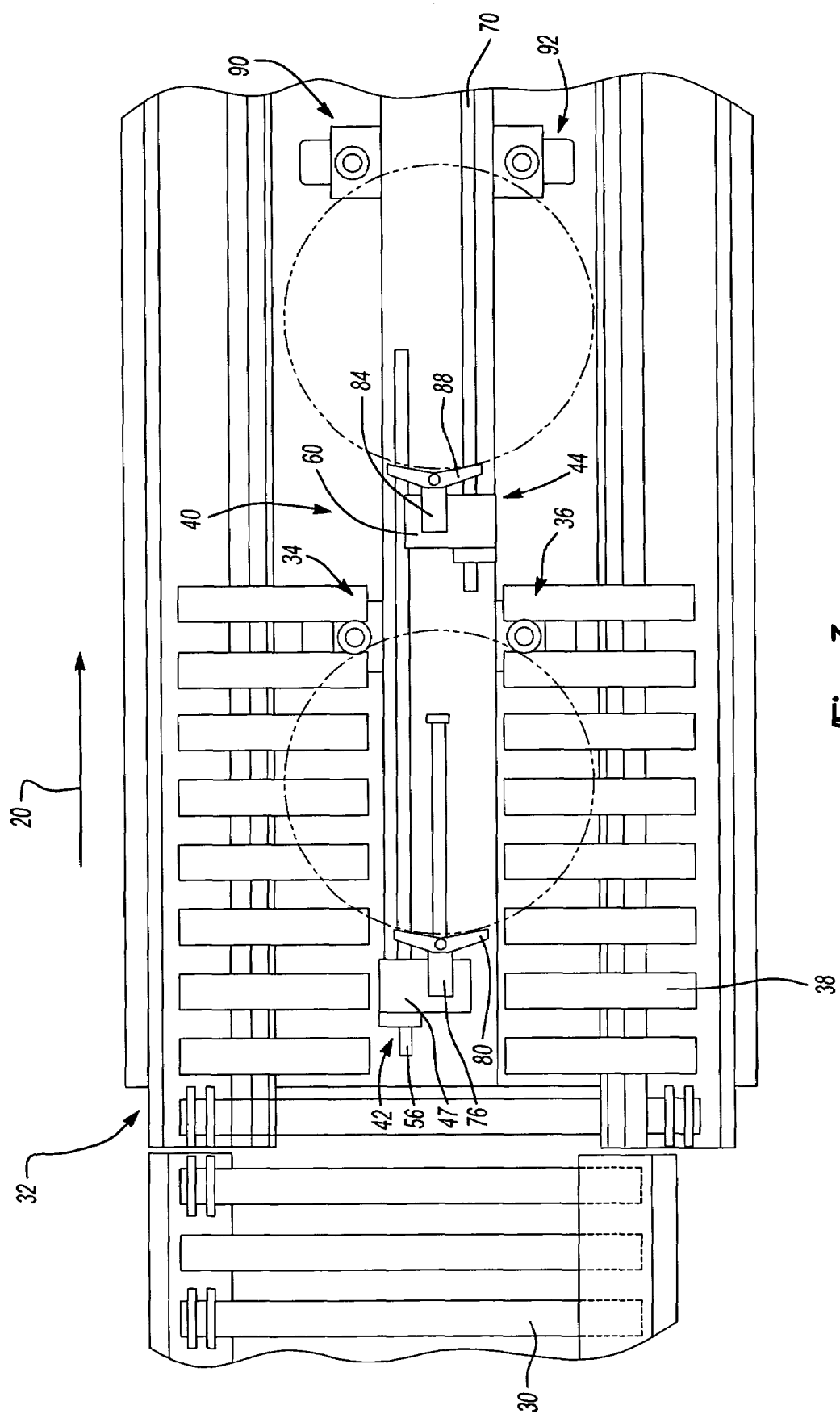
FIG. 3 is a top view of a portion of the valve stem installation system shown in FIGS. 1 and 2 showing pin stop assemblies positioned along a roller conveyor for preventing movement of a wheel along the roller conveyor.

Referring now to FIGS. 1 and 3, the conveyor 12 includes clutch-assisted, driven rollers 30 to move the wheel 14 from the identification station 24 to a first position 32 along the conveyor 12. The wheel 14 can move along the conveyor 12 in the direction 20 until the wheel 14 engages a pair of pin stops 34, 36. The conveyor 12 includes undriven rollers 38 between the first position 32 and the pin stops 34, 36. The pin stops 34, 36 are actuated between an extended position above the conveyor 12 and a retracted position below the conveyor 12 to stop movement of the wheel 14 in the direction 20 along the conveyor 12. The pin stops 34, 36 are controlled in movement by the controller 28. Sensors (not shown) are positioned along the conveyor 12 to sense the position of the wheel 14 along the conveyor 12 and communicate the sensed position of the wheel 14 to the controller 28.

Figure 4:
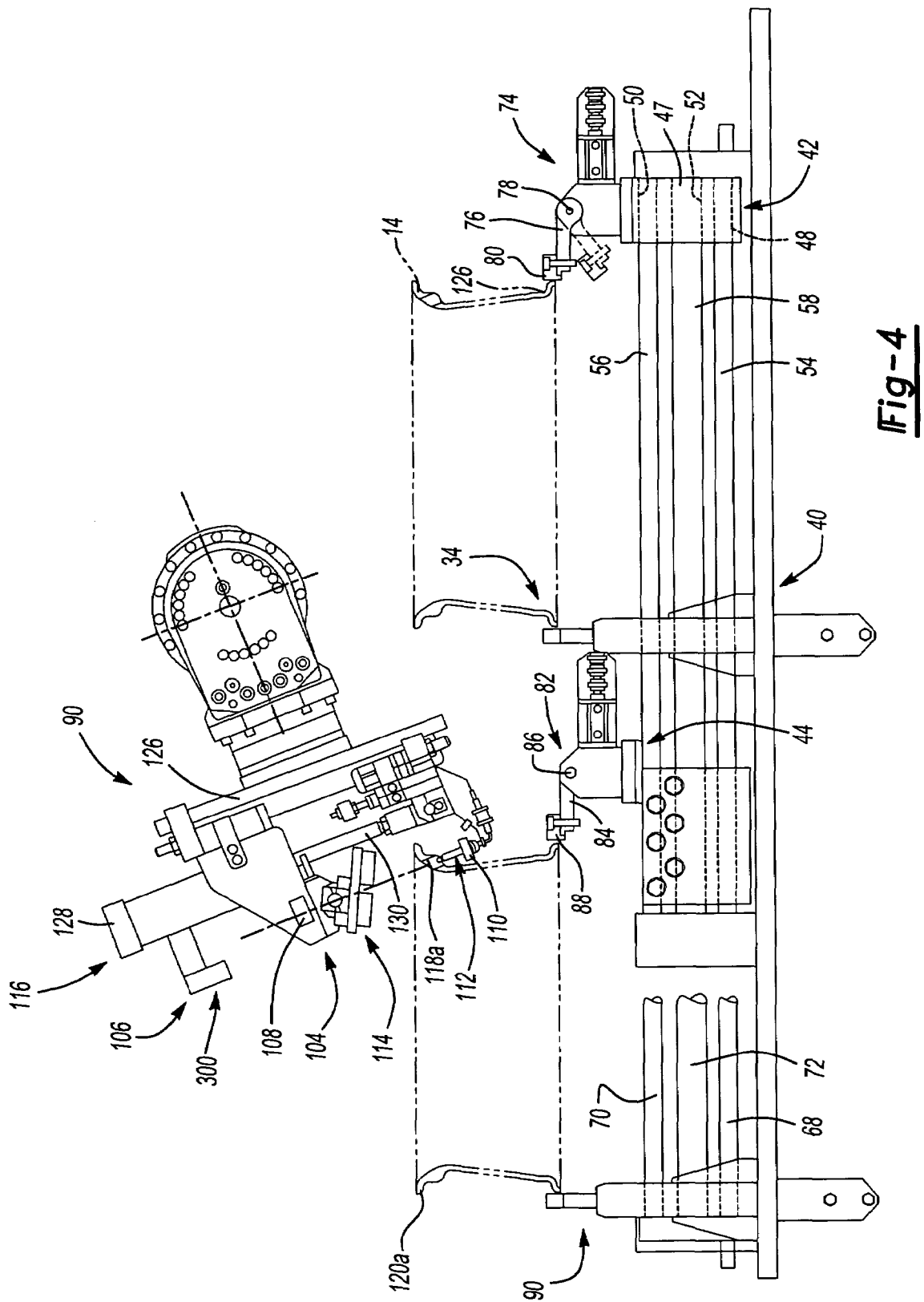
FIG. 4 is a partial cross-sectional view of the valve stem installation system shown in FIGS. 1-3 showing a positioning device for positioning a wheel and a locating and inserting assembly for inserting a valve stem in a valve stem aperture defined by a wheel.
Figure 5:
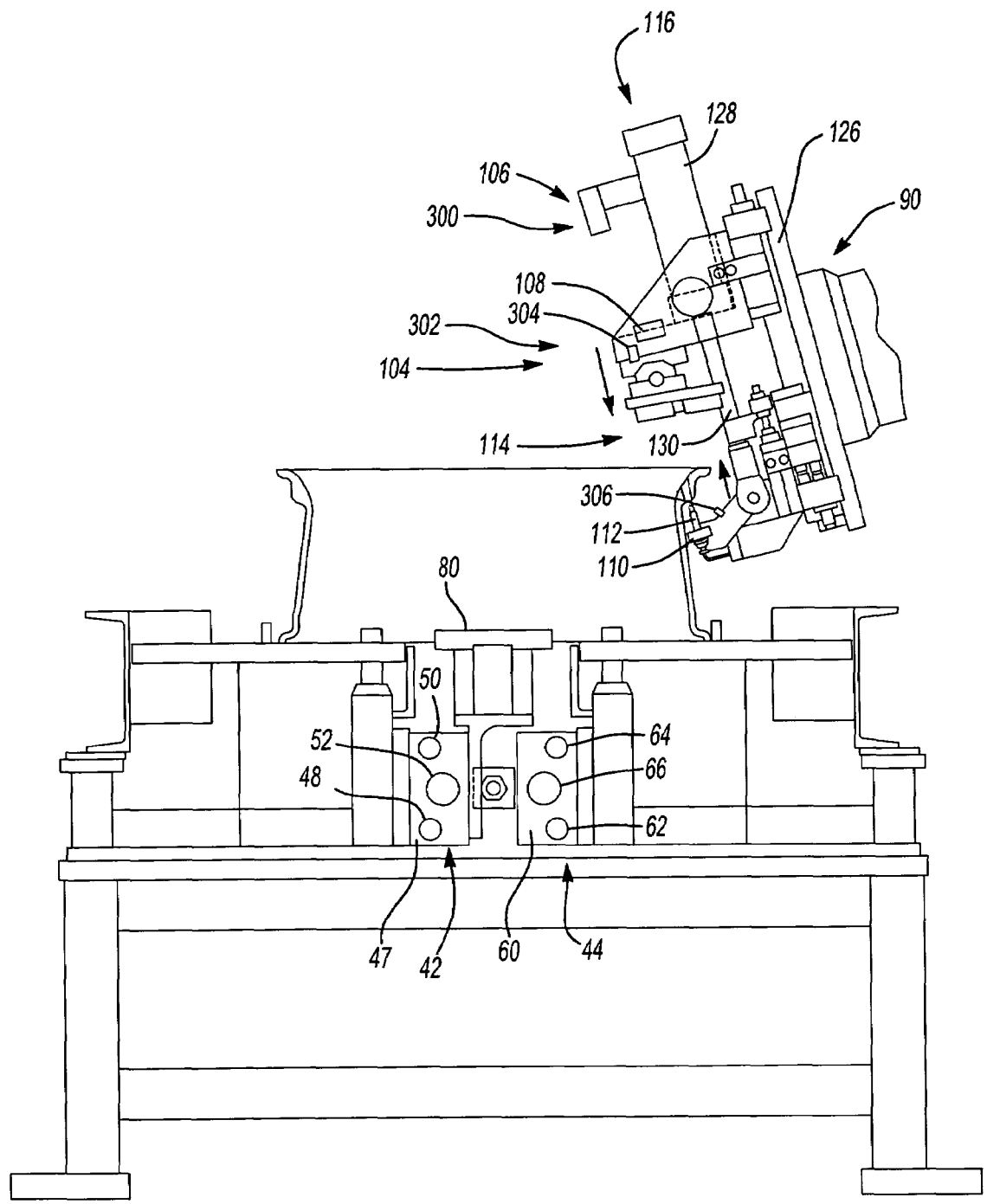
FIG. 5 is a partial cross-sectional view of the valve stem installation system shown in FIGS. 1-4 and offset ninety degrees from the view in FIG. 4, showing the positioning device and the locating and inserting assembly.

Referring now to FIGS. 1 and 3-5, a positioning device 40 is disposed along the conveyor 12 adjacent the robotic apparatus 16. The positioning device 40 includes a first positioning mechanism 42 and a second positioning mechanism 44. The positioning mechanisms 42, 44 are substantially similar with respect to one another and are disposed along the conveyor 12 between the first position 32 and a second position 46. The first positioning mechanism 42 includes a housing 47. The housing 47 defines apertures 48, 50 and 52 for receiving guide tracks 54, 56 and 58, respectively as best seen in FIGS. 4 and 5. The guide tracks 54, 56 and 58 guide movement of the housing 48 along the conveyor 12. A metal piston (not shown) is disposed internally of the guide track 58 and cooperate magnetically with the housing 48. For example, the housing 48 houses a magnet to attract the metal piston in the guide track 58. The piston is moved by selectively directing pressurized air to opposite sides of the piston in the guide track 58. The housing 48 moves in response to movement of the piston. The second positioning mechanism 44 is structured similarly and function similarly as the first positioning mechanism 42. For example, the second positioning mechanism 44 includes a housing 60 defining apertures 62, 64, 66 for receiving guide tracks 68, 70, 72, respectively, as best shown in FIGS. 4 and 5. A metal piston is disposed internally of the guide track 72 and cooperates with the housing 60 to move the housing 60 along the conveyor 12. Movement of the pistons inside the tracks 58, 72 are controlled by the controller 28.

Referring now to FIGS. 3-5, the first positioning mechanism 42 includes an engaging device 74 for engaging and moving the wheel 14 along the conveyor 12. The engaging device 74 is connected to the housing 47 and includes an arm 76 rotatable about an axis 78. An engaging portion 80 is disposed at the end of the arm 76 and is shaped to correspond to the shape of the wheel 14. During movement of the housing 47 along the conveyor 12 in the direction 20, the arm 76 is located in a first position shown in solid line in FIG. 4. After the housing 47 has moved a predetermined distance along the conveyor 12 in the direction 20, the arm 76 is moved to a second position shown in phantom in FIG. 4. The arm 76 is moved to the second position to prevent the engaging portion 80 from interfering with movement of a following wheel moving along the conveyor 12 and is therefore positioned below the conveyor 12. The positioning device 42 moves the wheel 14 along the conveyor 12 to a position along the conveyor 12 at which the second positioning mechanism 44 can engage the wheel 14. The second positioning mechanism 44 includes an engaging device 82 structured similarly and functioning similarly as the first engaging device 74. For example, the engaging device 82 includes an arm 84 rotatable about an axis 86 and an engaging portion 88 positioned at the end of the arm 84. The second positioning mechanism 44 moves the wheel 14 away from the robotic apparatus 16 after a valve stem has been inserted in the valve stem aperture defined by the wheel, a process described in greater detail below. Once the second positioning mechanism 44 moves the wheel 14, the first positioning mechanism 42 moves a second wheel 14 along the conveyor 12 until the second wheel 14 engages a second pair of pin stops 90, 92.

Figure 6:
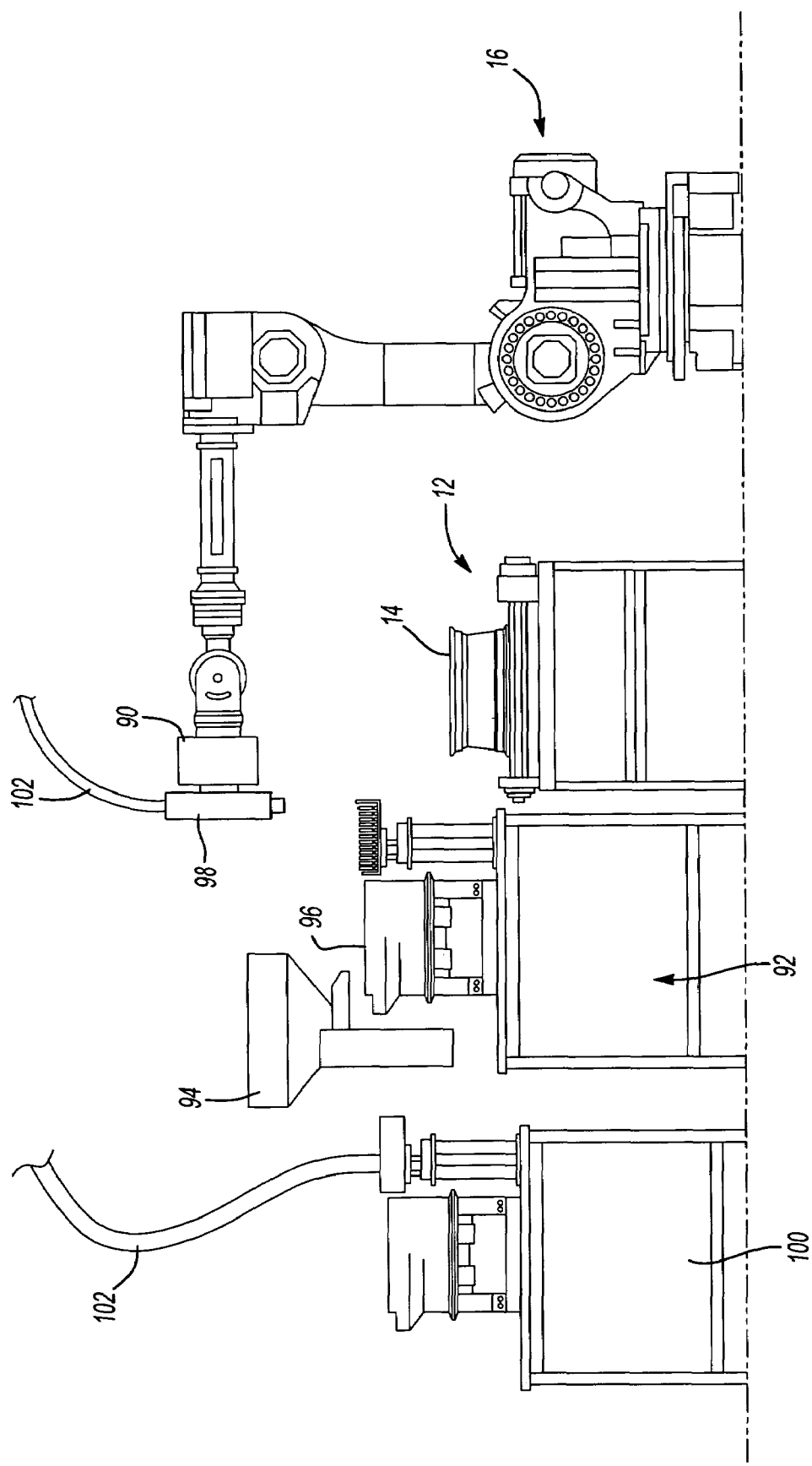
FIG. 6 is a side view of the valve stem installation system shown in FIG. 1 with additional structural details.

Referring now to FIGS. 1 and 6, after the wheel 14 is positioned adjacent the robotic apparatus 16 by the positioning device 40, the robotic apparatus 16 inserts a valve stem in the valve stem aperture defined by the wheel 14. The robotic apparatus 16 moves a locating and inserting assembly 90 around the wheel 14, shown schematically in FIGS. 1 and 6. The assembly 90 receives valve stems from one or more valve stem feeding stations 92 disposed along the conveyor 12. Each station 92 includes a hopper 94 for receiving valve stems and a sorting device 96 for sorting the valve stems and arranging the valve stems in an orientation to be received by the assembly 90. The different valve stem feeding stations 92 sort different configurations of valve stems. A nut runner 98 is attached to the assembly 90 to insert nuts on valve stems that require nuts. The nut runner 98 receives nuts from a nut feeding station 100 through a conduit 102. The station 100 can be disposed along the conveyor 12.

Referring now to FIGS. 4 and 5, the assembly 90 includes a locating device 104 and a stem inserting device 106. The locating device 104 includes a pair of light emitters, such as light emitter 108, and a pair of light receivers, such as light receiver 110. The inserting device 106 includes a valve stem holding pin 112, a support plate 114, and a moving device 116 for moving the holding pin 112 and the support plate 114 relative to one another.

The method for locating the valve stem aperture in the wheel is shown schematically in FIGS. 7-10. In FIG. 7, the embodiment of the assembly 90a includes a pair of light emitters 108a and 108b, as well as a pair of light receivers 110a and 110b. The assembly also includes a support plate 114a and a valve stem holding pin 112a. The assembly 90a is moved around the wheel 14 in the direction 122. The light emitters 108a, 108b are disposed on an opposite side of a lip 120 of the wheel 14 with respect to the light receivers 110a, 110b. The valve stem aperture 118 is defined in the lip 120. The assembly 90a is moved in the direction 122 and the light receiver 110a receives light from the light emitter 108a through the valve stem aperture 118. The assembly 90a moves in the direction 122 at a predetermined angular velocity and is slowed by the controller 28 in response to the communication between the light emitter 108a and the light receiver 110a through the valve stem aperture 118.

Figure 10:
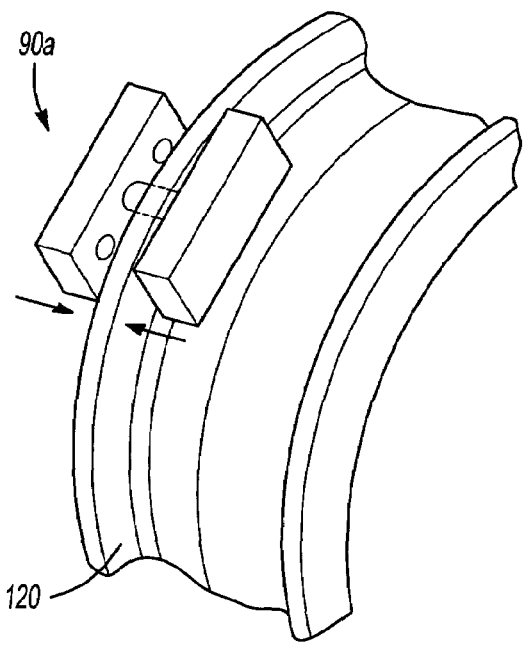

Referring now to FIG. 8, the assembly 90a is stopped after passing the valve stem aperture 118. Due to the delay between sensing the light by the first receiver 110a, signaling the controller 28, the assembly 90a typically passes the aperture 118 prior to stopping the robot 16. The assembly 90a is moved in the direction 124 until the light receiver 110b receives light from the light emitter 108b through the valve stem aperture 118, shown in FIG. 9. In response to the communication between the light receiver 110b and the light emitter 108b through the valve stem aperture 118, the assembly 90a is moved in the direction 122 until the valve stem holding pin 112 is aligned with the aperture 118 and the valve stem is then inserted, as shown in FIG. 10. The assembly 90a moves much faster in the direction of arrow 122 than in the direction of arrow 124 because more distance is typically traveled to first locate the aperture 118. Once the aperture 118 is located, the assembly moves at a slower rate in the direction of arrow 124 to determine a more precise location of the aperture 118 prior to aligning the stem holding pin 112a with the aperture 118.

Referring now to FIGS. 4 and 5, the valve stem is inserted in the valve stem aperture 118a defined in the lip 120a of the wheel 14 by engaging the moving device to move the valve stem holding pin 112 relative to the support plate 114. The moving device 116 includes a plate 126 attached to the robotic apparatus 16. The moving device 116 also includes a cylinder 128 attached to the plate 126 and a rod 130 extendable and retractable with respect to the cylinder 128. The valve stem holding pin 112 is fixedly associated with the end of the rod 130 and the support plate 114 is rotatably associated with the cylinder 128. After the valve stem aperture 118 has been located the robotic apparatus moves the support plate 114 to engage the lip 120a of the wheel 14. The rod 130 is retracted in the cylinder 128, moving the valve stem holding pin 112 through the aperture 118a. The rod 130 is extended to remove the valve stem holding pin 112 from the aperture 118a, leaving the valve stem in the valve stem aperture 118a.

Referring now to FIGS. 3 and 4, after the valve stem has been inserted in the valve stem aperture 118a, the second positioning mechanism 44 moves the wheel with the inserted valve stem along the conveyor 12 past the retracted pin stops 90-92. The wheel 14 now continues along the conveyor 12 for further processing operations.

Figure 11:
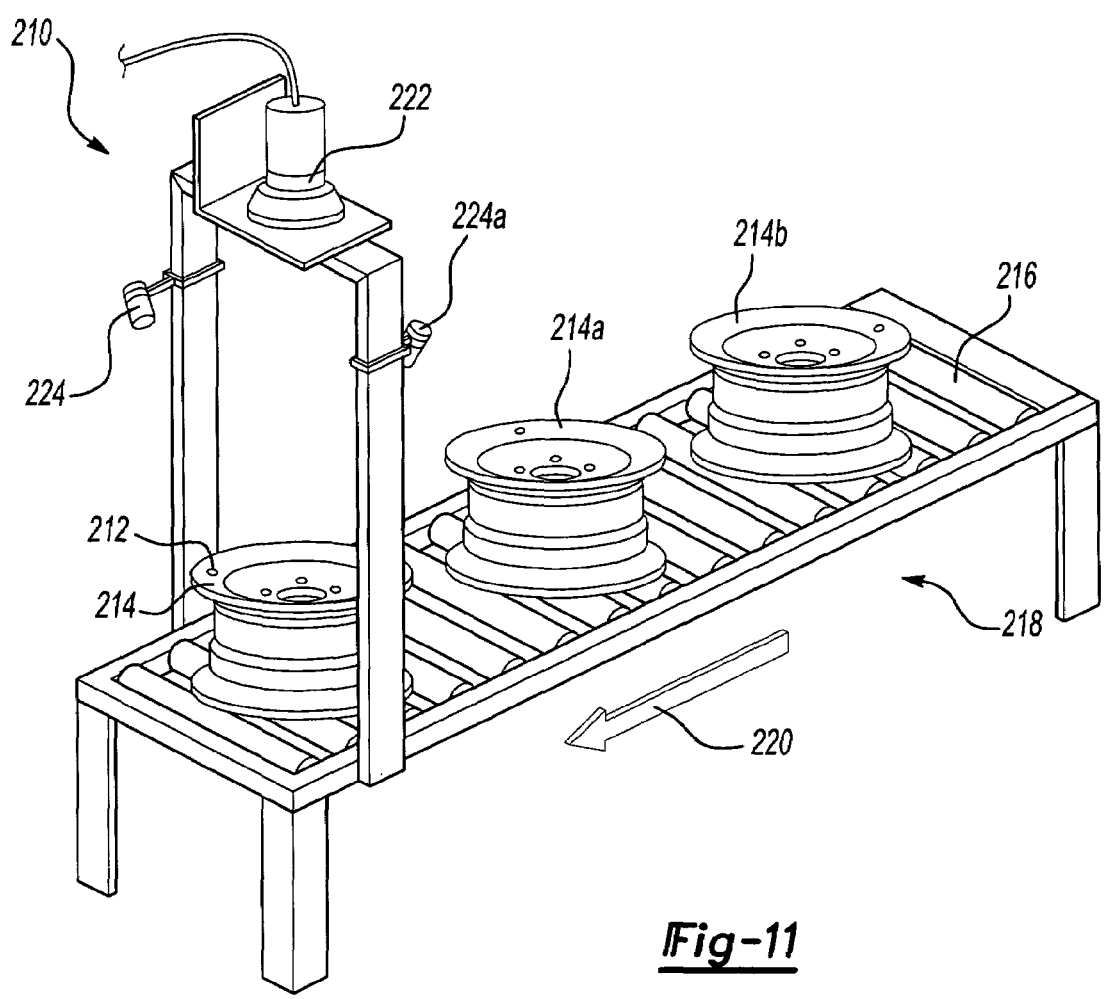
FIG. 11 is a perspective view of a second exemplary embodiment of a locating station.

Referring now to FIG. 11, the invention includes a locating station 210 for initially locating a valve stem aperture 212 and a wheel 214. Wheels 214, 214a, 214b are moved along rollers 216 of an assembly line 218 in a direction 220 to the locating station 210. At the locating station 210, the wheel 214 is scanned by a camera 222 positioned above the assembly line 218. The locating station 210 can include one or more lights to enhance the quality of the image scanned by the camera 222.

Figure 12:
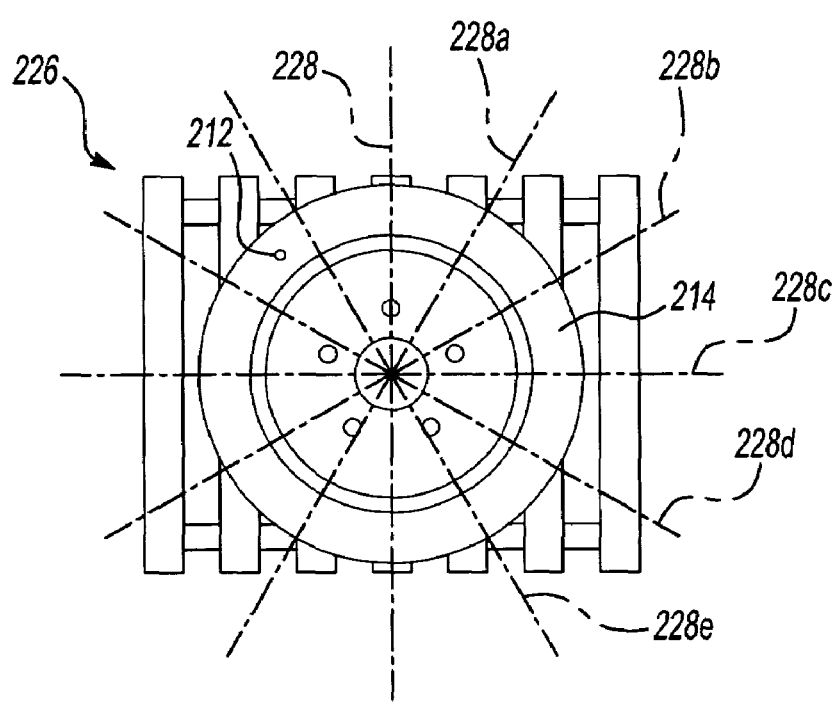
FIG. 12 is top view of a scanned image of the wheel divided into radial zones.

Referring now to FIG. 12, the image of the wheel 214 that is scanned by the camera 222 is communicated to a controller (not shown). The controller divides the scanned image into a plurality of radial zones and initially locates the valve stem aperture 212 in terms of the radial zone that defines the valve stem aperture 212. For example, in the exemplary embodiment of the invention, the valve stem aperture 212 is defined by the radial zone 226. The controller divides the plurality of radial zones by boundary lines 228, 228a, 228b, 228c, 228d, 228e. Preferably, the controller divides the wheel 214 with as many boundary lines as possible to define as many radial zones as possible. The greater the number of radial zones, the more accurate the initial locating of the valve stem aperture 212 will be. However, in an alternative embodiment described in greater detail below, the more accurate the initial locating of the valve stem after 212, the more precisely that a valve stem insertion tool can be moved or positioned at least initially with respect to the wheel 214. A general location of the valve stem aperture 212 is identified within 3-7 millimeters.

Figure 13:
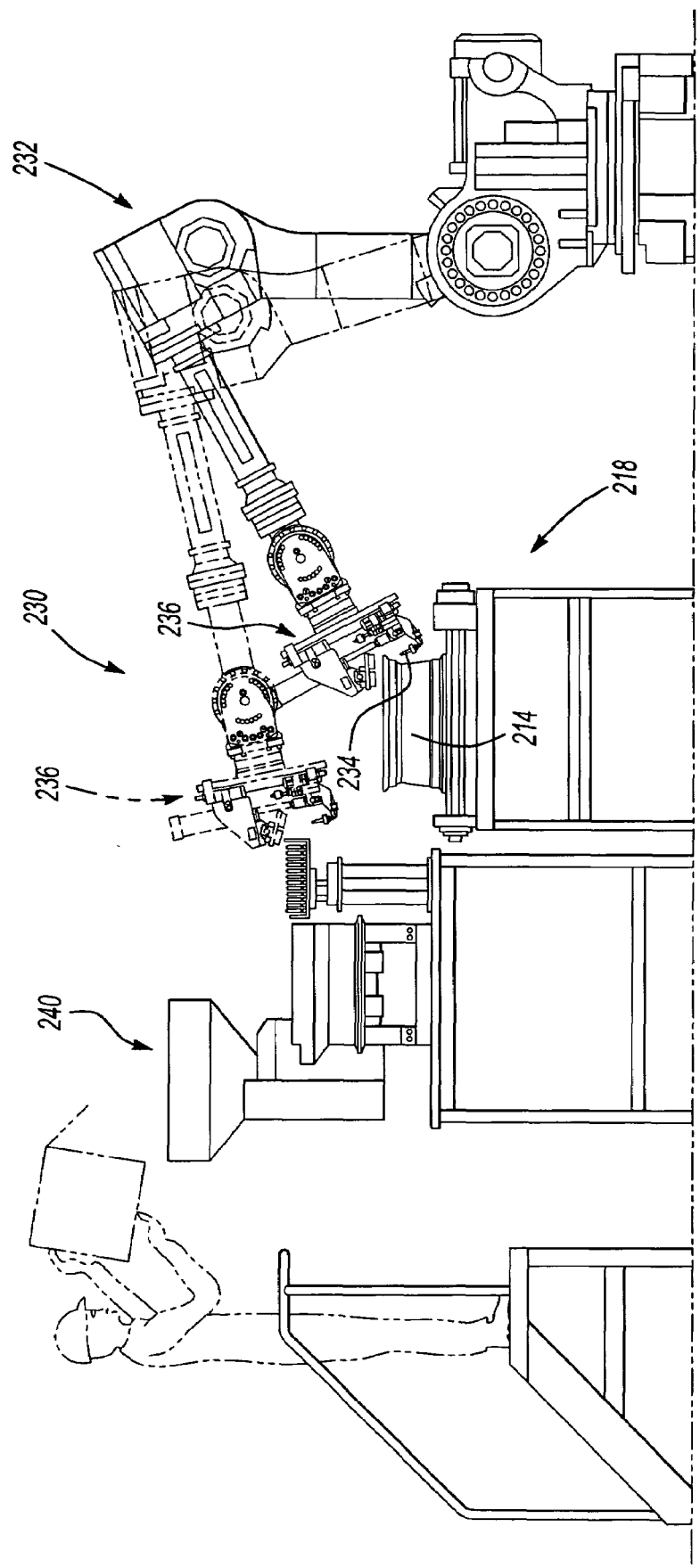
FIG. 13 illustrates a side view of the stemming station.

Referring now to FIG. 13, after the image of the wheel 214 is scanned at the locating station 210 (shown in FIG. 11), the wheel 214 is moved to a stemming station 230. The stemming station 230 includes a robot 232 for inserting a valve stem 234 in the valve stem aperture 212 (shown in FIGS. 11 and 12). The robot 232 supports a valve stem insertion tool 236. When the wheel 214 arrives at the stemming station 230, the robot 232 moves the valve stem insertion tool 236 to the radial zone defining the valve stem aperture 212. As discussed above, the greater the number of radial zones, the more precisely the robot 232 can initially position the valve stem insertion tool 236. The valve stem insertion tool 236 includes a valve stem aperture sensor to precisely locate the valve stem aperture 212 in the radial zone 226 (shown in FIG. 12). The stemming station 230 also includes a valve stem sorter 240 for sorting and positioning valve stems. The robot 232 moves the valve stem insertion tool 236 to the valve stem sorter 240 to receive a valve stem 234.

Referring now to FIGS. 1, 4 and 5, a camera 300 is fixedly mounted to the inserting assembly 90, which is movably positioned at an end of the robotic apparatus 16. The camera 300 is substantially similar to the camera 26 disposed at the identification station 24. The robotic apparatus 16 moves the camera 300 toward the radial zone in which the valve stem aperture 118a is defined to locate the valve stem aperture 118a. The cycle time for processing the wheel 14 is reduced with respect to previous valve stem insertion systems. For example, the camera 300 communicates with the controller 28 during movement towards the radial zone in which the valve stem aperture 118a is defined and the controller 28 adjusts movement of the robotic apparatus 16 in response to communications from the camera 300. In other words, the movement of the robotic apparatus 16 can be adjusted on the fly in response to current operating conditions. The camera 300 also increases accuracy with respect to locating the valve stem aperture 118a over optical sensors, which can be desirable when a TPM valve stem is being assembled to the wheel 14. However, the exemplary embodiment of the invention also includes an optical sensor 302 having an emitter 304 and a receiver 306. If a standard, rubber valve stem is being assembled to the wheel 14, for example, valve stem aperture 118a can be located with the optical sensor 302 since the accuracy required is less than the accuracy required for a TPM valve stem.

Obviously, many modifications and variations of the present invention are possible in light of the above teachings. The invention may be practiced otherwise than as specifically described within the scope of the appended claims. These antecedent recitations should be interpreted to cover any combination in which the incentive novelty exercises its utility. In addition, the reference numerals in the claims are merely for convenience and are not to be read in any way as limiting.

The invention claimed is:

1. A method of inserting a valve stem into a valve stem aperture defined by a wheel movable along an assembly line, said method comprising the steps of:

positioning a controller, an identification station to identify configuration of the wheel and a valve stem insertion station along the assembly line and cooperable with said identification station and said controller to locate the valve stem aperture and insert a valve stem into the valve stem aperture;

identifying a location of the valve stem aperture by dividing the image of the wheel scanned by said identification station into a plurality of segments defined by radial lines to determine the segment defining the valve stem aperture and the location of the segment relative the assembly path; and signaling a valve stem insertion device of said valve stem insertion station with the segment where the valve stem aperture is located to align the segment with said valve stem insertion device to insert the valve stem into the valve stem aperture.

2. The method as set forth in claim 1, including the step of locating a central axis of the valve stem aperture to align the valve stem with the central axis of the valve stem aperture before inserting the valve stem into the valve stem aperture.

3. The method as set forth in claim 2, including the step of signaling said controller an image of the wheel thereby enabling said controller to identify the wheel.

4. The method as set forth in claim 3, determining the location of the valve stem relative to the segment from the image generated by said identification station.

5. The method as set forth in claim 4, wherein said step of signaling said valve stem insertion device the segment the valve stem aperture is located is further defined by said controller signaling said valve stem insertion device.

6. The method as set forth in claim 1, further including the step of providing a robotic manipulator to said valve stem insertion station, wherein said valve stem insertion device and said valve stem location device are mounted to said robotic manipulator.

7. The method as set forth in claim 1, further including the step of moving said valve stem insertion device to the segment signaled by said identification station for inserting the valve stem into the valve stem aperture.

8. The method as set forth in claim 1, further including the step of moving said valve stem location device to the segment signaled by said identification station.

9. The method as set forth in claim 1, wherein said identifying step is further defined as identifying the location of the valve stem aperture relative to the segment defined by the wheel at said identification station with a first camera and wherein said locating step is further defined as locating a central axis of the valve stem aperture with a second camera associated with said valve stem aperture location device thereby aligning the valve stem with the central axis of the valve stem aperture.

* * * * *